United States Patent [19]
Kohlpaintner et al.

[11] Patent Number: 5,484,184
[45] Date of Patent: Jan. 16, 1996

[54] OPENABLE VEHICLE ROOF WITH A FLEXIBLE SCREEN TO COVER A VISIBLE GAP ON THE SIDE

[75] Inventors: George Kohlpaintner, Martinsried; Kurt Kugler, Stockdorf; Stjepan Radmanic, Mammendorf; Roland Wittal, Munich; Manfred Nowak, Kaufering, all of Germany

[73] Assignee: Webasto Karosseriesysteme GmbH, Stockdorf, Germany

[21] Appl. No.: 382,575

[22] Filed: Feb. 2, 1995

[30] Foreign Application Priority Data

Feb. 2, 1994 [DE] Germany ............................ 44 03 163.7

[51] Int. Cl.[6] ........................................................ B60J 7/22
[52] U.S. Cl. .......................................... 296/217; 296/214
[58] Field of Search ...................................... 296/214, 217, 296/216

[56] References Cited

U.S. PATENT DOCUMENTS 4,702,518 10/1987 Paerisch et al. ..................... 296/217

FOREIGN PATENT DOCUMENTS 3308065 7/1988 Germany.
3932207 4/1991 Germany .......................... 296/217

*Primary Examiner*—Dennis H. Pedder
*Attorney, Agent, or Firm*—Sixbey Friedman Leedom & Ferguson

[57] ABSTRACT

An openable vehicle roof with a cover, by which a roof opening can be alternately closed or at least partially opened. By a flexible screen, a visible gap on each lateral side, resulting from the pivoting out of the cover above a fixed roof panel, is covered. The top end of the screen is connected to the cover near a respective side edge of the cover, and its bottom end is supported to slide lengthwise in a guideway connected to the fixed roof panel. By the construction of the screen, a simple installation and a space-saving arrangement is made possible.

9 Claims, 3 Drawing Sheets

OPENABLE VEHICLE ROOF WITH A FLEXIBLE SCREEN TO COVER A VISIBLE GAP ON THE SIDE

BACKGROUND OF THE INVENTION

1. Field of the Invention

The invention relates to an openable vehicle roof with a cover to selectively close and at least partially expose an opening in a fixed roof panel, with a flexible screen placed on both sides of the cover to cover a visible gap that results on the side when the rear edge of the cover is pivoted out above the fixed roof panel.

2. Description of Related Art

A generic vehicle roof is known from published German Patent Application No. 39 32 207 in which a bellows-like screen is held on its bottom end by a guide bracket that is attached to the front part of the cover. The pivoting out of the bellows-like screen part is performed by a separate hinge-like leg spring. Because of the required attachment of the guide bracket to the underside of the cover, such a screen is relatively expensive to install.

A sliding and lifting roof with flexible screens is known from U.S. Pat. No. 4,702,518 in which flexible screens are provided for covering up of the gap between the lateral edges of a sliding liner panel which can be lifted and a guide part that participates in the sliding movement, but not the lifting movement of the cover. The flexible screens are each located at a respective side of sliding liner panel and is stretched around a lateral edge of the part of the sliding liner panel which may be pushed out and/or is guided around the guide part, and is held taut by means of a tensioning arrangement. However, such a screen arrangement is also relatively expensive to install and does not provide screening between the cover and the liner panel.

SUMMARY OF THE INVENTION

The primary object of this invention is to provide an openable vehicle roof with a screen that is easy to assemble and uses little space.

This object is achieved according to the preferred embodiment of the invention in which the top end of screen near the side edge of the cover is connected to the cover, and its bottom end is supported to slide lengthwise in a guideway connected to the fixed roof panel. Because the top end of the screen is connected to the cover near the side edge of the cover, and the bottom end of the screen is supported to slide lengthwise in a guideway connected to the fixed roof panel, such a screen can be accommodated with the least space, on the one hand, and on the other hand, when the cover is pivoted out, it is automatically spread out with it because of the cover movement, so that a separate spring or tensioning mechanism can be dispensed with.

An especially simple installation results from the screen being detachably connected, on its bottom end, to a carriage that is supported in a guide rail placed to the side of the roof opening. Here, it is especially advantageous when the screen, with tongues provided on its bottom end, is able to be pushed into corresponding receiving slots on the carriage. Advantageously, the tongues have elastic catches to fasten them in the receiving slots. To hold the screen stably in its rear area, it is advantageous for the carriage to have guide means for at least temporary engagement with a part also supported in the guide rails, for example, a rear guide shoe.

Suitable rubber bellows known in the art or a screen made of thermoplastic material with a flexible center part, that can be produced from a thermoplastic elastomer (TPE) after solid top and bottom parts, in a second work step in the same tool (that is, in a two-component process), can be used as a flexible screen in accordance with the present invention.

To facilitate the transfer of the slaving forces between the cover and the screen, it is advantageous for the carriage to have a fixture in which a driver attached to the cover engages. In this way, a definite slaving of the screen by the cover is guaranteed when it is pushed, which otherwise, because of the flexibility of the screen material, is obtained only to a limited extent.

To guide the screen in the lower area so it is certain not to tip over, it is advantageous for the carriage to extend essentially over the entire length of the screen.

An especially advantageous multiple use results from the fact that a rail placed on the bottom end of the screen simultaneously forms a guideway and a stop for a driver of a sliding lining placed under the cover. This way, the rigid rail part, that is necessary anyway on the underside of the screen to fasten it, is simultaneously used to limit the movement of a sliding lining, so that the separate parts otherwise necessary for the latter can be eliminated.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENT

Figure 1:
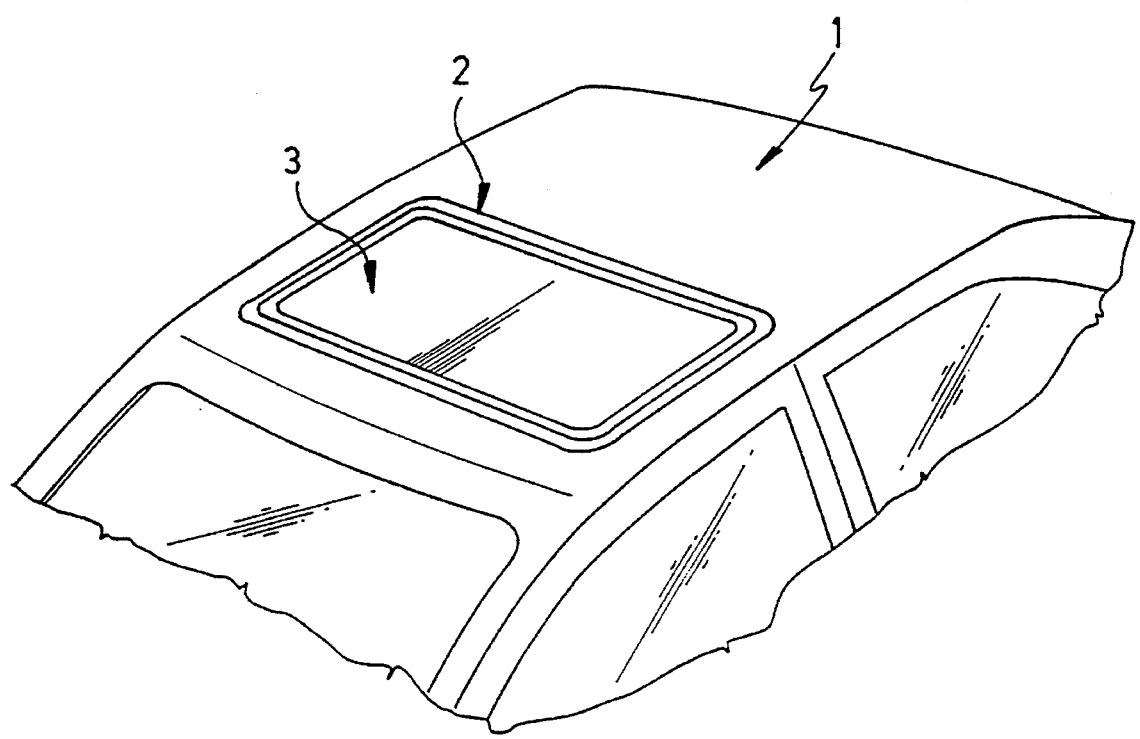
FIG. 1 is a diagrammatic perspective top view of a vehicle roof.

In FIG. 1, a roof opening 2 is provided in a fixed roof panel 1 which can be selectively opened or closed by a cover 3. To open roof opening 2, cover 3, in a known way, can first be pivoted out above fixed roof panel 1 at its rear edge, on a pivot pin placed near the forward edge, or it can be lowered beneath the fixed roof panel 1 and then slid under it. To cover a visible gap on the side, that results when cover 3 is pivoted above fixed roof panel 1, a screen designated overall by 4 and made of a flexible material, such as a bellows-like rubber, is provided. Top end 5 of screen 4 is made as a more rigid strip in comparison to the flexible center part and is connected to the center part under cover 3.

Bottom end 6 of screen 4 is also rigid in comparison to the flexible center part of the screen and is constructed as a rail 7 with a guideway 7A that is open on the side and that, on its front and rear ends, is bounded in each case by a stop 7C or 7D. Rail 7 further has projecting tongues 8 that are provided on their top side with elastic catches 9.

Figure 2:
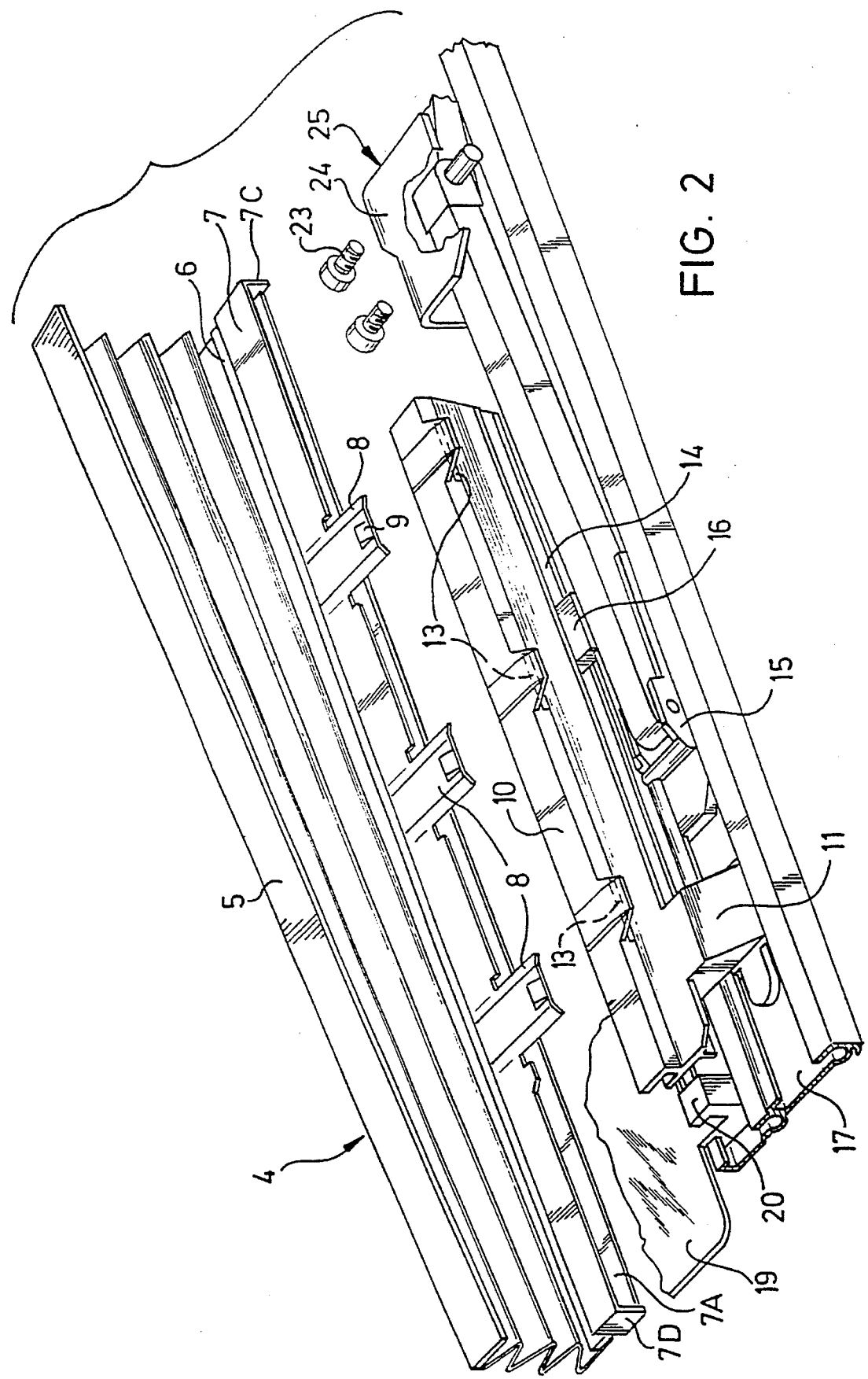
FIG. 2 is an exploded, diagrammatic perspective side view of a first embodiment of a screen in accordance with the present invention.

A guide rail 17 is placed on each side of roof opening 2 and the guide rails 17 are used to guide shoes connected to the cover and of which, in FIG. 2, only rear guide shoe 15 is represented. Additional carriages 10 are supported in the guide rails 17 by a bridge 11, so as to be able to slide lengthwise therein. Carriages 10 have receiving slots 13 for the receiving tongues 8 of the bottom end of screen 4. By pushing tongues 8 of rail 7 into receiving slots 13, the bottom end 6 of screen 4 is supported so as to be slidable on the carriage 10 in the respective guide rail 17, along with the guide shoe 15. The catches 9 provide for a stopping of tongues 8 in the direction crosswise to the vehicle longitudinal axis. Carriage 10, additionally, has a guide track 14 in which a projection 16 on rear guide shoe 15 engages. Carriage 10 is thus guided in the guide rail on bridge 11 not only by its relatively short front guide shoe, but indirectly is also braced, by guide track 14 and projection 16, to slide on rear guide shoe 15. Mechanism 25 for outward pivoting (of known construction and thus not described in more detail) is connected to the rear guide shoe, and it is fastened by a plate 24 and screws 23 to a cover carrier or cover inner plate located on the underside of cover 3.

A driver 20 on the top side of a sliding liner 19 engages in guideway 7A of rail 7. The path of driver 20 in guideway 7A is bounded by stops 7C or 7D on the ends. When cover 3 is pivoted out, sliding lining 19, thus, can be slid by hand rearward until driver 20 strikes stop 7C on the rear end of rail 7. When moved forward, the movement of sliding lining 19 is bounded by the striking of driver 20 against forward stop surface 7D of rail 7. Since, when cover 3 is slid rearward under fixed roof panel 1, screen 4 is completely slaved with rail 7, the sliding lining 19 is, likewise, slaved rearward by the abutment of driver 20 against forward stop 7D, so that roof opening 2, in this state, is completely opened. When cover 3 is moved forward, driver 20 is again slaved forward by rear stop 7C so far that a recessed grip, not represented, provided on the inside of sliding lining 19, is reachable by the user.

The installation of the screen represented in FIG. 2 is performed such that carriage 10, complete with the forward and rear guide shoes, is pushed into guide rail 17 and, when the cover is installed, the top end 5 of screen 4 is connected to the underside of the cover, for example by clipping it in. Then, tongues 8 are pushed into receiving slots 13 of carriage 10.

Figure 3:
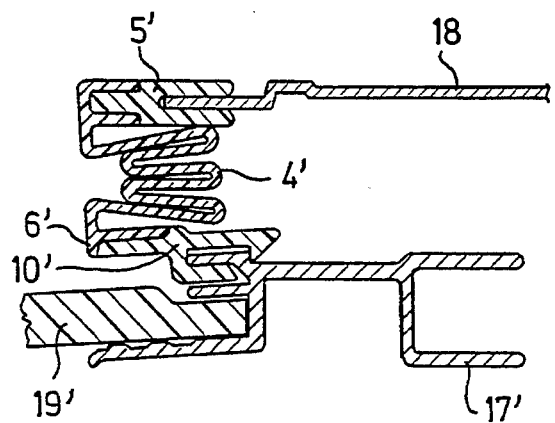
FIG. 3 is a cross section through a second embodiment of a screen in accordance with the present invention.
Figure 4:
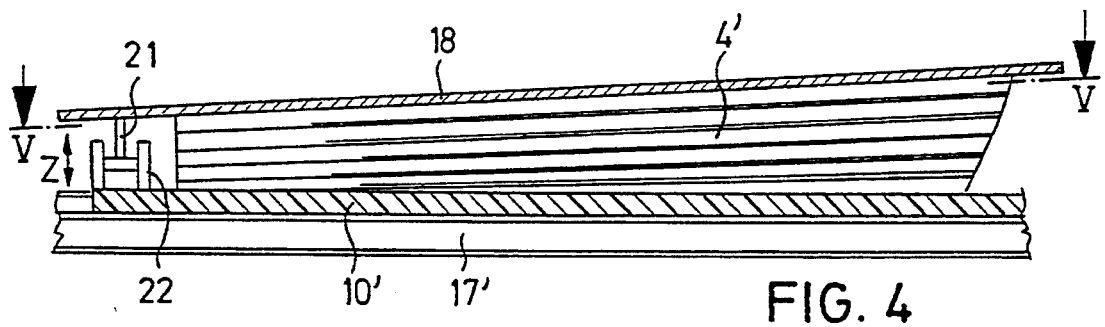
FIG. 4 is a diagrammatic side view of the screen according to FIG. 3.
Figure 5:
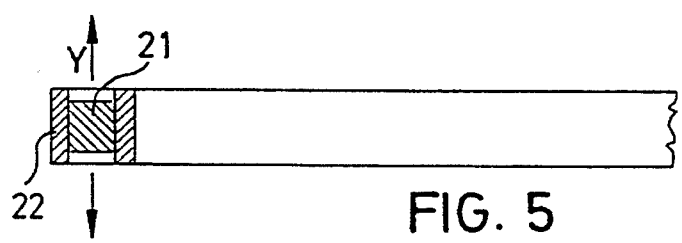
FIG. 5 is a horizontal sectional view taken along line V-V in FIG. 4.

In FIGS. 3 to 5, a modified screen is shown, and the same parts are provided with the same reference numbers but are distinguished by a prime ('). The screen, designated overall by 4', is fastened by clipping its top end 5' to a cover inner plate 18 that is fastened to the underside of cover 3. On bottom end 6' of screen 4', a carriage-like part 10' is directly molded on, for example by two-component injection molding, and it extends over approximately the entire length of screen 4' and additionally, on its forward end, it has means (described below) for coupling it to move with the cover. By lateral pushing from the inside, carriage part 10' can be clipped to a guide rail 17'. Because of the guiding of screen part 4' over its entire length, tipping of it is prevented, so that sliding lining 19', likewise guided by guide rails 17', is not impeded in its movement.

On the top side in the forward part of carriage part 10', a fork-shaped fixture 22 is provided in which, from the top, a driver 21 on the underside of cover inner plate 18 engages.

Fixture 22 and driver 21 are designed so that, as represented in FIG. 4, a leveling of the height in the Z-direction is possible. Both parts are, on the other hand, designed so that, as can be seen in FIG. 5, in the direction crosswise to the vehicle longitudinal axis, an aligning movement in the Y-direction is made possible. The installation of screen part 4' is also performed in a simple way by clipping top end 5' to cover inner plate 18, and then, clipping carriage part 10' to the corresponding part of guide rail 17' (FIG. 3).

With the invention, a screen part is made that is easy to install and is able to be accommodated in a space-saving way when the cover is closed.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. An openable vehicle roof of the type having a cover for selectively closing and at least partially exposing a roof opening in a fixed roof panel by either of rearward sliding or upward pivoting movements of the cover relative to the fixed roof panel, with a flexible screen located on each of opposite lateral sides of the cover for covering a laterally visible gap between the cover and the fixed roof panel resulting from upward pivoting of the cover above the fixed roof panel; wherein a top end of each screen is connected to the cover near a respective side edge thereof; wherein a bottom end of each screen is supported or slide means to slide lengthwise in a guideway connected to the fixed roof panel; and wherein a rail on the bottom end of each screen simultaneously forms a guideway and a stop for a driver of a sliding liner located underneath the cover.

2. An openable vehicle roof according to claim 1, wherein said slide means comprises the bottom end being detachably connected to a carriage that is supported in the guideway on the respective side of the roof opening.

3. An openable vehicle roof according to claim 2, wherein each screen has tongues on its bottom end which are engaged in corresponding receiving slots on said carriage.

4. An openable vehicle roof according to claim 3, wherein said tongues have elastic catches for fastening in the receiving slots.

5. An openable vehicle roof according to claim 2, wherein the carriage has guide means for at least a temporary engagement with a part that is supported in the guide rail.

6. An openable vehicle roof according to claim 2, wherein screen is formed by a rubber bellows.

7. Openable vehicle roof according to claim 2, wherein the carriage extends essentially over the entire length of screen.

8. An openable vehicle roof according to claim 1, wherein the screen is formed by a rubber bellows.

9. An openable vehicle roof according to claim 1, wherein the upper end of each screen is connected to the cover by being clipped onto a inner plate attached to the underside of the cover.

* * * * *